No. 725,403.  
PATENTED APR. 14, 1903.  
J. E. BREITWISER.  
BALL BEARING MECHANISM.  
APPLICATION FILED AUG. 6, 1897.  
NO MODEL.
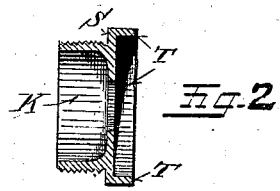
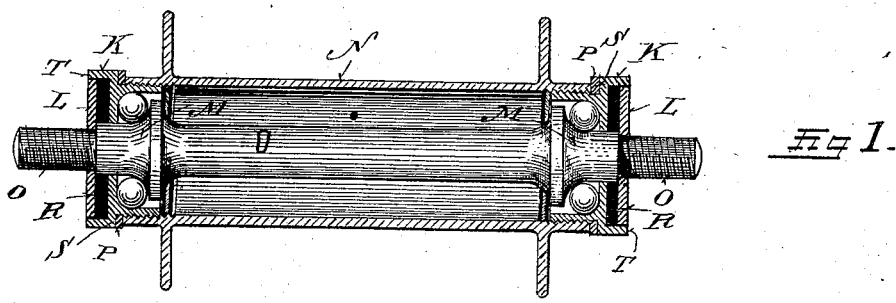

UNITED STATES PATENT OFFICE.

J. EDISON BREITWISER, OF SPRINGFIELD, OHIO.

BALL-BEARING MECHANISM.

SPECIFICATION forming part of Letters Patent No. 725,403, dated April 14, 1903.

Application filed August 6, 1897. Serial No. 647,387. (No model.)

*To all whom it may concern:*

Be it known that I, J. EDISON BREITWISER, a citizen of the United States, residing at Springfield, in the county of Clark and State of Ohio, have invented certain new and useful Improvements in Ball-Bearing Mechanism, of which the following is a specification, reference being had therein to the accompanying drawings.

My invention relates to improvements in ball-bearing mechanism, the object of which is to construct a ball-bearing mechanism that, practically speaking, will not vibrate in the crank-hanger, and that will not admit dust or foreign matter to its bearings, and that requires no adjustment when once properly adjusted. I attain these objects by means of the mechanism illustrated.

Figure 1 is a sectional view of the hub and crank ball-bearing mechanism. Fig. 2 is a sectional view of one of the dust-proof cups.

I make the axle O of one solid piece of metal and the cones M M a part thereof. This solid cone overcomes the constant need of adjustment occasioned by the use of loose cones, and every rider who is compelled to stop every few miles to adjust the ordinary hub will appreciate this improvement. It also enables the ball-bearings to be so constructed that the points of contact can be upon the upper and lower points of the ball or, in other words, the balls bear upon the cones M M and cups K K at points directly to or from the center of the hub. It also enables the cones to be properly tempered. A cup K, Figs. 1 and 2, is securely screwed into each end of the hub N until the shoulder S rests firmly against the friction-washer P. This brings these cups solidly in position as much so as if they were part of the hub, overcoming the loosening of cups and cones so annoying to cyclists. These cups K K have their point of contact upon the upper points of the balls, so there is no need of exact adjustment, as where the adjustment is at an angle, as heretofore; but, if desired, thinner or thicker washers P P are used for this purpose. A flange T projects beyond the plane of the cup K a sufficient distance to allow a washer L to be parallel with its outer surface and to allow an open space between the cup and washer. A felt washer R fills this space completely, making it dust or water proof. The front and rear forks fit over the threaded ends of the axle O and rest against the washers L L, being secured by the usual nuts. (Not shown.) Hence no vibration of the frame is against the cups or cones. Thus I make a bicycle with a frame devoid of vibration and a hub having no dust or need of adjustment.

Having thus described my invention, I wish to claim as new—

In a ball-bearing mechanism, the combination with an axle having cones integral therewith and a shoulder outside of each cone, of ball-bearing cups having a shoulder S and a flange T, a hub N to which said cups are screwed until their shoulders strike the ends of the hub, washers adapted to fit against the shoulders of said axle and within the flange of said cups, and a packing between the flanges and washer, all substantially as shown and described.

In testimony whereof I affix my signature in presence of two witnesses.

J. EDISON BREITWISER.

Witnesses:
 J. T. THORLEY,
 C. V. BISH.